(12) United States Patent
Tuxen et al.

(10) Patent No.: US 12,742,852 B2
(45) **Date of Patent: *Sep. 22, 2026**

(54) DEVICE, SYSTEM, AND METHOD FOR TRACKING AN OBJECT USING RADAR DATA AND IMAGER DATA

(71) Applicant: TRACKMAN A/S, Vedbaek (DK)

(72) Inventors: Fredrik Tuxen, Rungsted Kyst (DK); Thomas Søndergaard, Vedbaek (DK)

(73) Assignee: TRACKMAN A/S, Hørsholm (DK)

( * ) Notice: Subject to any disclaimer, the term of this patent is extended or adjusted under 35 U.S.C. 154(b) by 406 days.

This patent is subject to a terminal disclaimer.

(21) Appl. No.: 18/488,447

(22) Filed: Oct. 17, 2023

(65) Prior Publication Data

US 2024/0045021 A1 Feb. 8, 2024

Related U.S. Application Data

(63) Continuation of application No. 17/301,448, filed on Apr. 2, 2021, now Pat. No. 11,828,867, which is a (Continued)

(51) Int. Cl.
*G01S 7/02* (2006.01)
*A63B 69/36* (2006.01)
(Continued)

(52) U.S. Cl.
CPC ................ *G01S 7/02* (2013.01); *A63B 69/36* (2013.01); *G01S 3/802* (2013.01); *G01S 13/32* (2013.01);
(Continued)

(58) Field of Classification Search
CPC ....... A63B 69/36; G01S 13/32; G01S 13/536; G01S 13/58; G01S 13/70; G01S 13/867;
(Continued)

(56) References Cited

U.S. PATENT DOCUMENTS 10,989,791 B2 * 4/2021 Tuxen .................. G01S 13/536
11,828,867 B2 * 11/2023 Tuxen .................... G01S 13/58
(Continued)

FOREIGN PATENT DOCUMENTS

| | | |
|---|---|---|
| CN | 102087354 | 6/2011 |
| CN | 103477243 | 12/2013 |
| CN | 105477845 | 4/2016 |
| CN | 105487070 | 4/2016 |

*Primary Examiner* — Timothy A Brainard
(74) *Attorney, Agent, or Firm* — Fay Kaplun & Marcin, LLP

(57) ABSTRACT

A system for tracking the movement of an object includes a radar device having a first field of view. The radar device generates radar data indicating one of a range corresponding to a distance of a moving object within the first field of view from the radar device and a range rate corresponding to a rate at which the distance is changing relative to the radar device. The system also includes an imager having a second field of view at least partially overlapping the first field of view in an overlap field of view. The imager generates imager data measuring, when the object is in the second field of view, an angular position of the object relative to the imager in at least one dimension. In addition, the system includes a processor combining the radar data and imager data, when the object is in the overlap field of view, to identify a track of the object in at least two dimensions.

15 Claims, 13 Drawing Sheets

Related U.S. Application Data continuation of application No. 15/369,372, filed on Dec. 5, 2016, now Pat. No. 10,989,791.

(51) Int. Cl.

| | |
|---|---|
| ***G01S 3/802*** | (2006.01) |
| ***G01S 13/32*** | (2006.01) |
| ***G01S 13/536*** | (2006.01) |
| ***G01S 13/58*** | (2006.01) |
| ***G01S 13/70*** | (2006.01) |
| ***G01S 13/86*** | (2006.01) |
| ***G01S 13/88*** | (2006.01) |
| ***G01S 13/93*** | (2020.01) |

(52) U.S. Cl.

CPC ............ *G01S 13/536* (2013.01); *G01S 13/58* (2013.01); *G01S 13/70* (2013.01); *G01S 13/867* (2013.01); *G01S 13/88* (2013.01); *G01S 13/93* (2013.01)

(58) Field of Classification Search

CPC .......... G01S 13/88; G01S 13/93; G01S 3/802; G01S 7/02

See application file for complete search history.

(56) References Cited

U.S. PATENT DOCUMENTS

| | | | | |
|---|---|---|---|---|
| 2008/0117098 | A1* | 5/2008 | Johnson .................. | G01S 13/90<br>342/25 F |
| 2008/0169963 | A1* | 7/2008 | White ....................... | G01S 7/22<br>342/357.53 |
| 2008/0207357 | A1* | 8/2008 | Savarese ................ | A63B 43/00<br>702/158 |
| 2010/0253540 | A1 | 10/2010 | Seder et al. | |
| 2016/0109566 | A1 | 4/2016 | Liu et al. | |
| 2016/0291145 | A1 | 10/2016 | Zeng et al. | |
| 2016/0320476 | A1* | 11/2016 | Johnson .................... | G06T 7/20 |

* cited by examiner

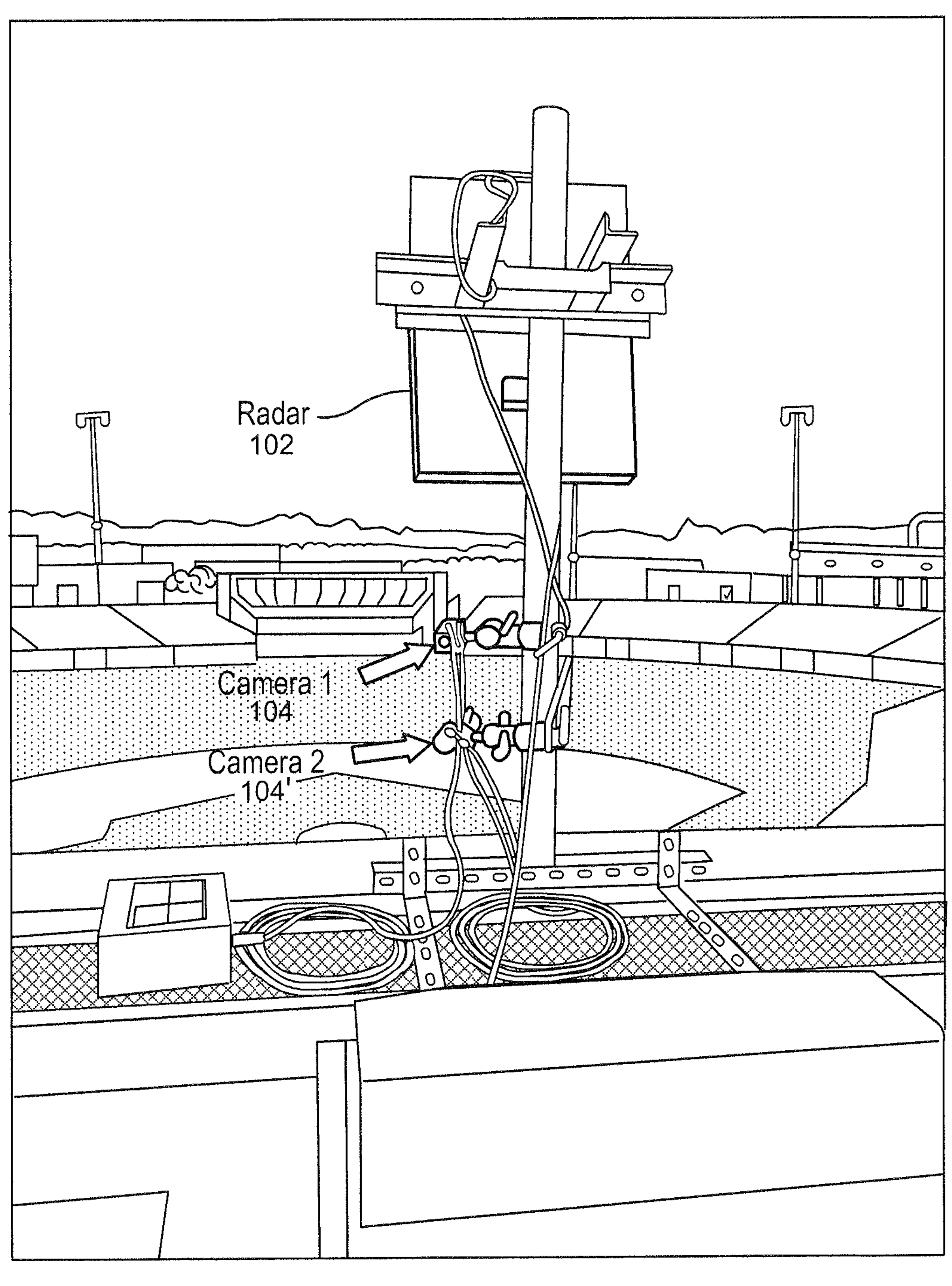
F I G. 2

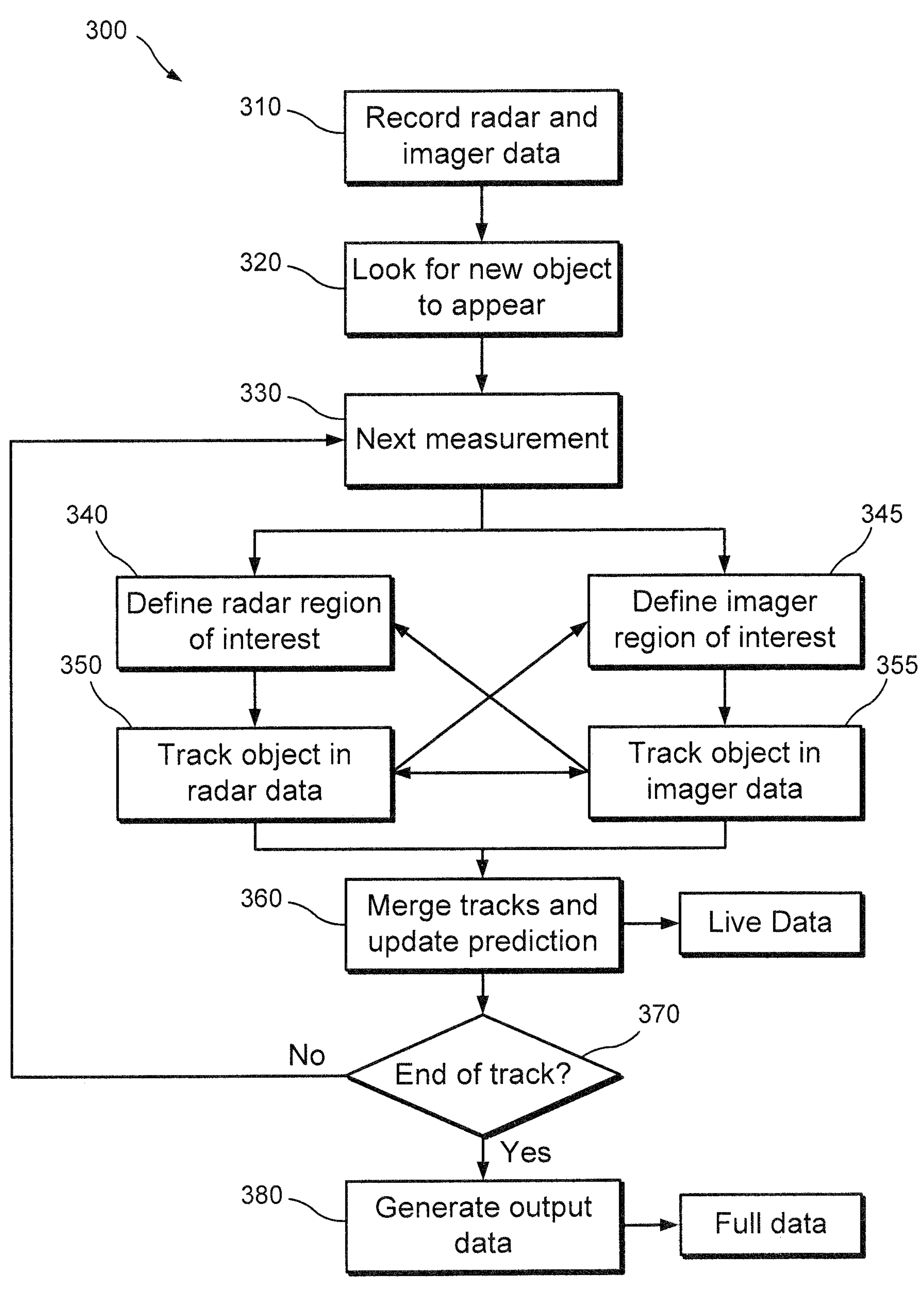
F I G. 7

Horizontal pixel, u

Vertical pixel, v

108

106'

110

From pixel to normalized pixel*

$$(u,\ v) = \frac{(u_{PX} - pp_u, v_{px} - pp_v)}{f}$$

$(u_{PX}, v_{px})$, pixel value in image $(pp_u, pp_v)$, principal point $(u,\ v)$, normalized pixel value, absolute value less than 1

$f$, focal distance

*More detailed conversation can be done to account for various distortions and imperfections.

From normalized pixel to unity vector·

$$\underline{n}_C = (\alpha_C, \beta_C, \gamma_C) = (1 - v, u) / \sqrt{1 + u^2 + v^2}$$

FIG 8

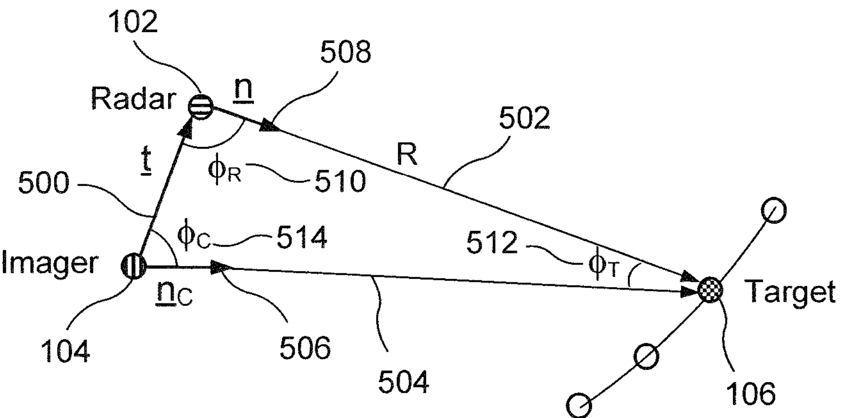

Combined 3D tracking radar and imager $\underline{X} = (x, y, z) = R \cdot \underline{n} = R_C \cdot \underline{n}_C - \underline{t}$ $R$, measured range from radar $\underline{t}$, predetermined $\underline{n}_C$, unity vector measured from image $$R_C = R \cdot \frac{\sin(\pi - \varphi_C - \varphi_T)}{\sin \varphi_C}$$

$$\varphi_T = \sin^{-1}\left(\frac{|\underline{t}|}{R} \sin \varphi_C\right)$$

$$\varphi_C = \cos^{-1}(dot(\underline{n}_C, \underline{t} / |\underline{t}|))$$

F I G. 10

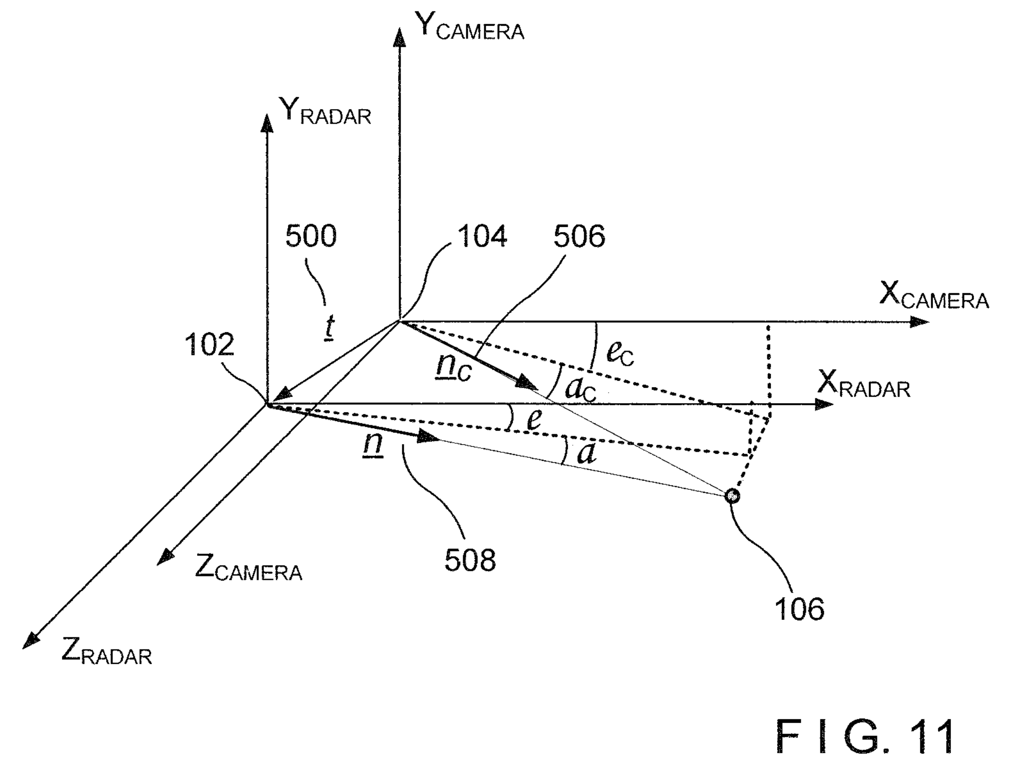
F I G. 11
$$\beta_C = \sin e_C$$
$$\gamma_C = \sin a_C$$
$$\underline{n}_C = (\alpha_C, \beta_C, \gamma_C)$$
$$\alpha_C = \sqrt{1 - \beta_C^2 - \gamma_C^2}$$
$$\beta = \sin e$$
$$\gamma = \sin a$$
$$\underline{n} = (\alpha, \beta, \gamma)$$
$$\alpha = \sqrt{1 - \beta^2 - \gamma^2}$$

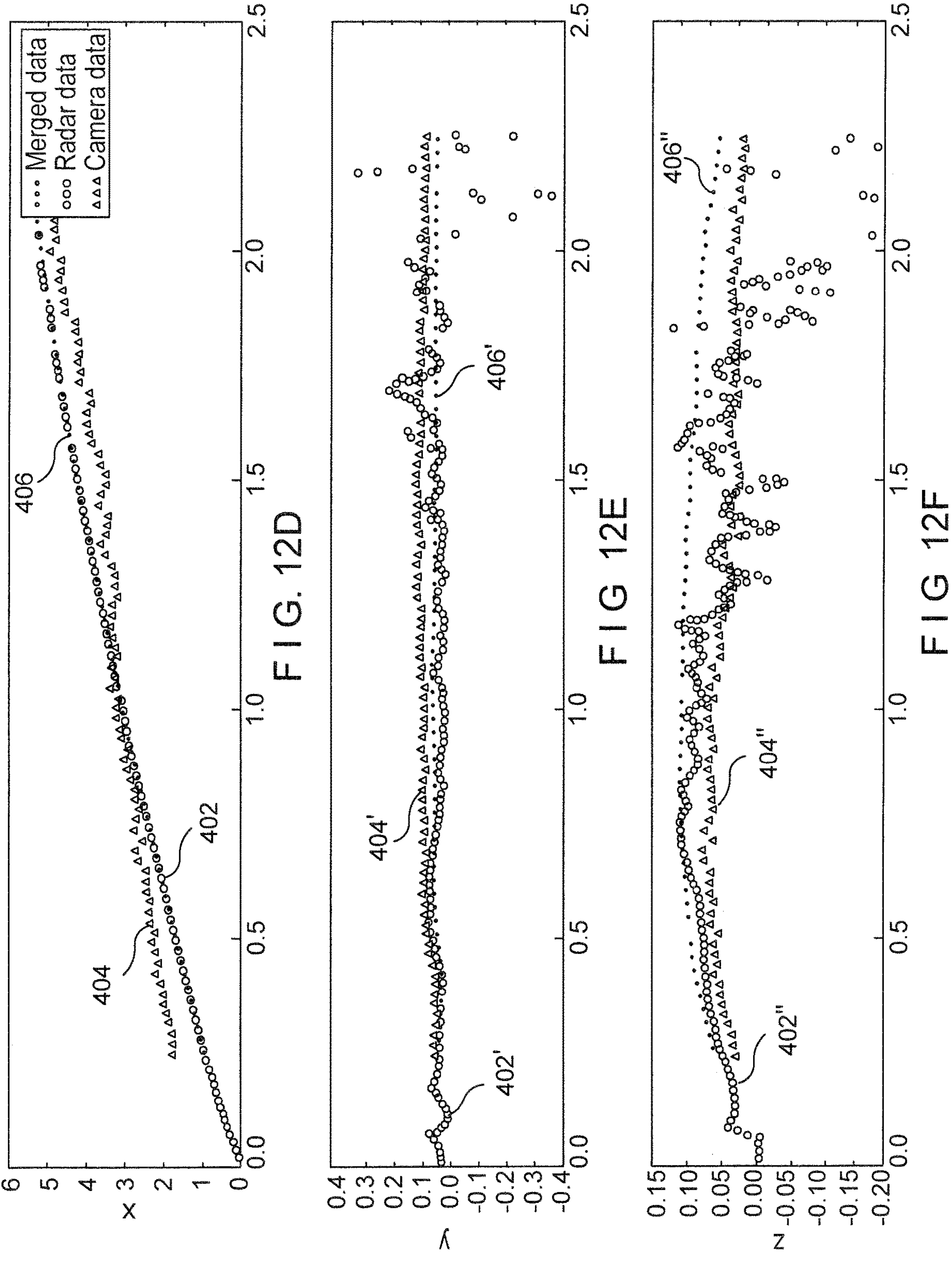
F I G. 12D
F I G 12E
F I G 12F

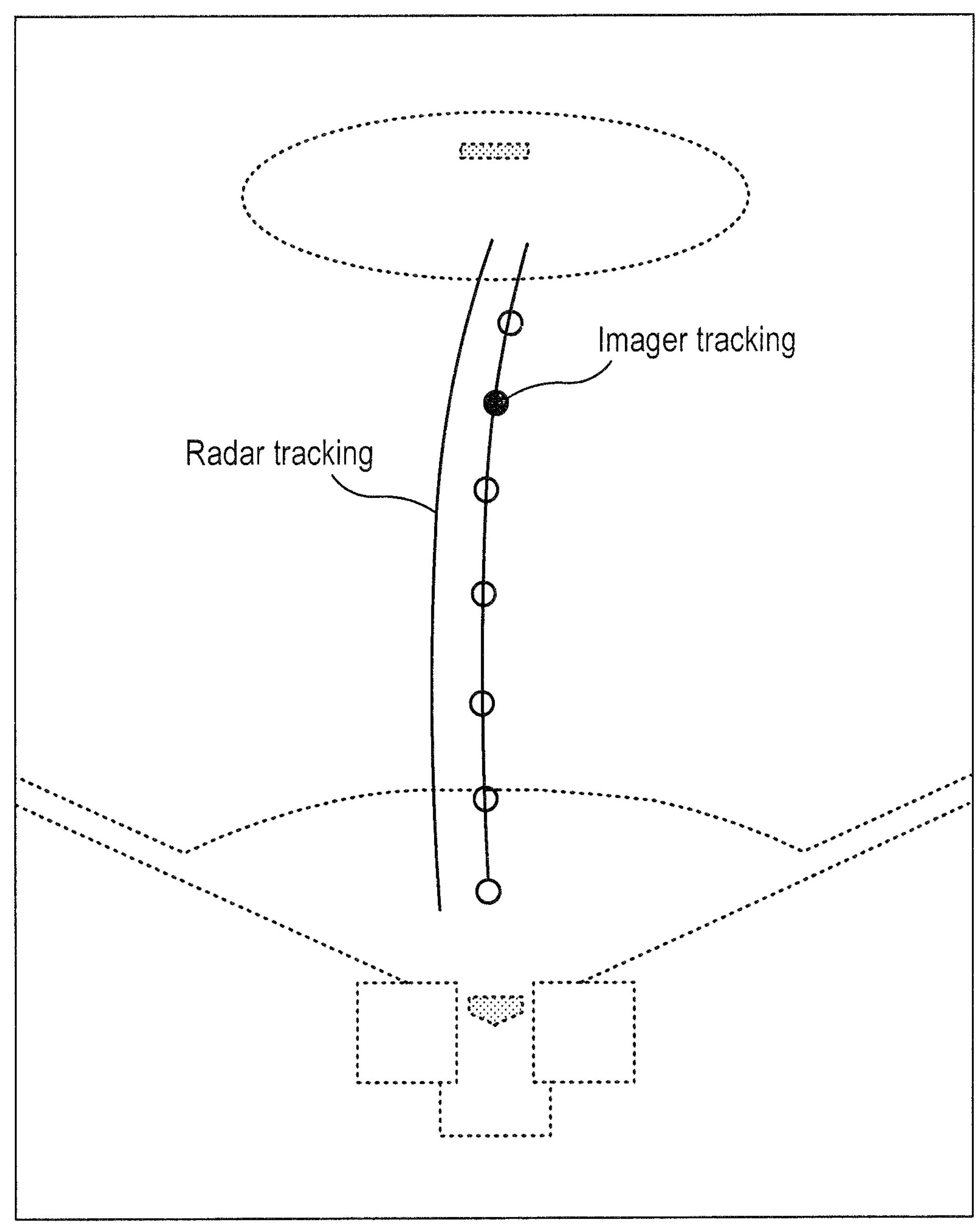
F I G. 13

DEVICE, SYSTEM, AND METHOD FOR TRACKING AN OBJECT USING RADAR DATA AND IMAGER DATA

PRIORITY CLAIM

The present application is a Continuation of U.S. patent application Ser. No. 17/301,448 filed on Apr. 2, 2021, now U.S. Pat. No. 11,828,867; which is a Continuation of U.S. patent application Ser. No. 15/369,372 filed on Dec. 5, 2016, now U.S. Pat. No. 10,989,791; the entire disclosure of the above application(s)/patent(s) is expressly incorporated herein by reference.

BACKGROUND

Tracking systems have used imagers capturing, for example, sequences of images of a target area including a moving object, to determining the position, speed and or trajectory of objects. However, these systems, which generally employ two-dimensional imagers, have been unable to provide the desired level of accuracy under certain conditions. In addition, radar tracking systems used to track objects have also suffered from certain deficiencies.

Prior systems have attempted to cure these defects by combining pulse radar with imagers to track items such as planes and missiles. However, such systems are generally unsuitable for tracking fast moving objects, such as sports balls, at short distances near the ground and other objects. For example, a pulse radar system determines the range to an object by transmitting signals at high power and determining a time required for the return of a portion of these signals reflected by the object. As only a very small fraction of the transmitted signal returns from the distant targets tracked by such systems, the receivers must be sensitive to faint signals orders of magnitude smaller than the transmitted signals. Thus, the receivers of such systems must be shut down when the pulse radar is transmitting or these highly sensitive receivers will be saturated or damaged by the high-power signal. The time required for the switch-over from transmission to receiving determines a minimum target range detectable by the pulse radar—generally on the order of several hundred meters. Furthermore, these systems are generally unable to discriminate between different objects at similar positions (e.g., a moving object passing close by a stationary object or an object moving on a different path). These systems are, therefore, not well suited to situations involved in, for example, tracking an object such as a sports ball passing through an area near the ground and including other objects such as moving or stationary players, trees, etc.

SUMMARY OF THE INVENTION

The present embodiments are directed to a system for tracking the movement of an object comprising a radar device having a first field of view, the radar device generating radar data indicating one of a range corresponding to a distance of a moving object within the first field of view from the radar device and a range rate corresponding to a rate at which the distance is changing relative to the radar device and an imager having a second field of view at least partially overlapping the first field of view in an overlap field of view, the imager generating imager data measuring, when the object is in the second field of view, an angular position of the object relative to the imager in at least one dimension in combination with a processor combining the radar data and imager data, when the object is in the overlap field of view, to identify a track of the object in at least two dimensions.

In an embodiment, the radar device is a one-dimensional radar and wherein the radar data includes a range rate for the object.

In an embodiment, the imager is a two-dimensional imager and the imager data measures the angular position of the object in at least two dimensions, the processor identifying the track of the object in three dimensions.

In an embodiment, the image tracking device measures vertical and horizontal angles in an imager coordinate system.

In an embodiment, the processor includes data corresponding to a separation vector indicating a distance and orientation from the radar device to the imager.

In an embodiment, the processor calculates a unity vector from the imager to the object and, based on the unity vector, the radar data and the separation vector, the processor calculates the position of the object in three dimensions.

In an embodiment, the processor defines a field based coordinate system based on reference points within the overlap field of view and translates and rotates the position of the object in three dimensions into the field based coordinate system.

In an embodiment, the radar device detects a distance to the object and one of a horizontal and vertical angle to the target.

An embodiment also includes a memory storing a priori information predictive of a location in which the object is to be found.

In an embodiment, the processor uses the a priori information to define a region of interest within which the object is expected to appear as a reduced portion of one of the first and second fields of view.

In an embodiment, the a priori information includes at least one of information about a prior position of the object and a prior speed of the object and a prior range of the object.

In an embodiment, the object is a sports ball and wherein the a priori information concerns a location from which the ball is likely to be put into play.

In an embodiment, the object is a sports ball and the target volume includes a field of play and wherein the reference points include locations significant to the rules of play of a game to be played on the field of play.

In an embodiment, the radar device is a Doppler radar.

In an embodiment, the processor determines the distance based on the range rate from the radar device and an initial value for the range.

In an embodiment, the initial range value is based on a priori knowledge.

A method for tracking the movement of an object according to an embodiment comprises positioning a radar device aimed so that first field of view covers at least a portion of a target volume through which an object is to move, the radar tracking device generating radar indicating a distance of a moving object within the first field of view from the radar and positioning an imager aimed so that a second field of view at least partially overlapping the first field of view within a desired portion of the target volume, the imager generating imager data measuring, when the object is in the second field of view, an angular position of the object relative to the imager in at least two dimensions in combination with combining the radar data and imager data, when the object is in the overlap field of view, to identify a track of the object in three dimensions.

BRIEF DESCRIPTION OF THE DRAWINGS

FIG. 2 shows a perspective view of a system for tracking and object according to another exemplary embodiment;

FIG. 7 shows a flow chart of a method for determining a trajectory of an object using the system of FIG. 1;

FIG. 8 shows an imager frame according to an exemplary embodiment of the system of FIG. 1;

FIG. 10 illustrates the vectors from the radar and imager to a target as well as a vector from the imager to the radar;

FIG. 11 illustrates the three-dimensional coordinate systems associated with the radar and the imager;

FIGS. 12A-F show data generated by the system of FIG. 1; and

FIG. 13 shows an exemplary image outputted by the system of FIG. 1 with an object track superimposed on a captured frame.

DETAILED DESCRIPTION

Figure 1:
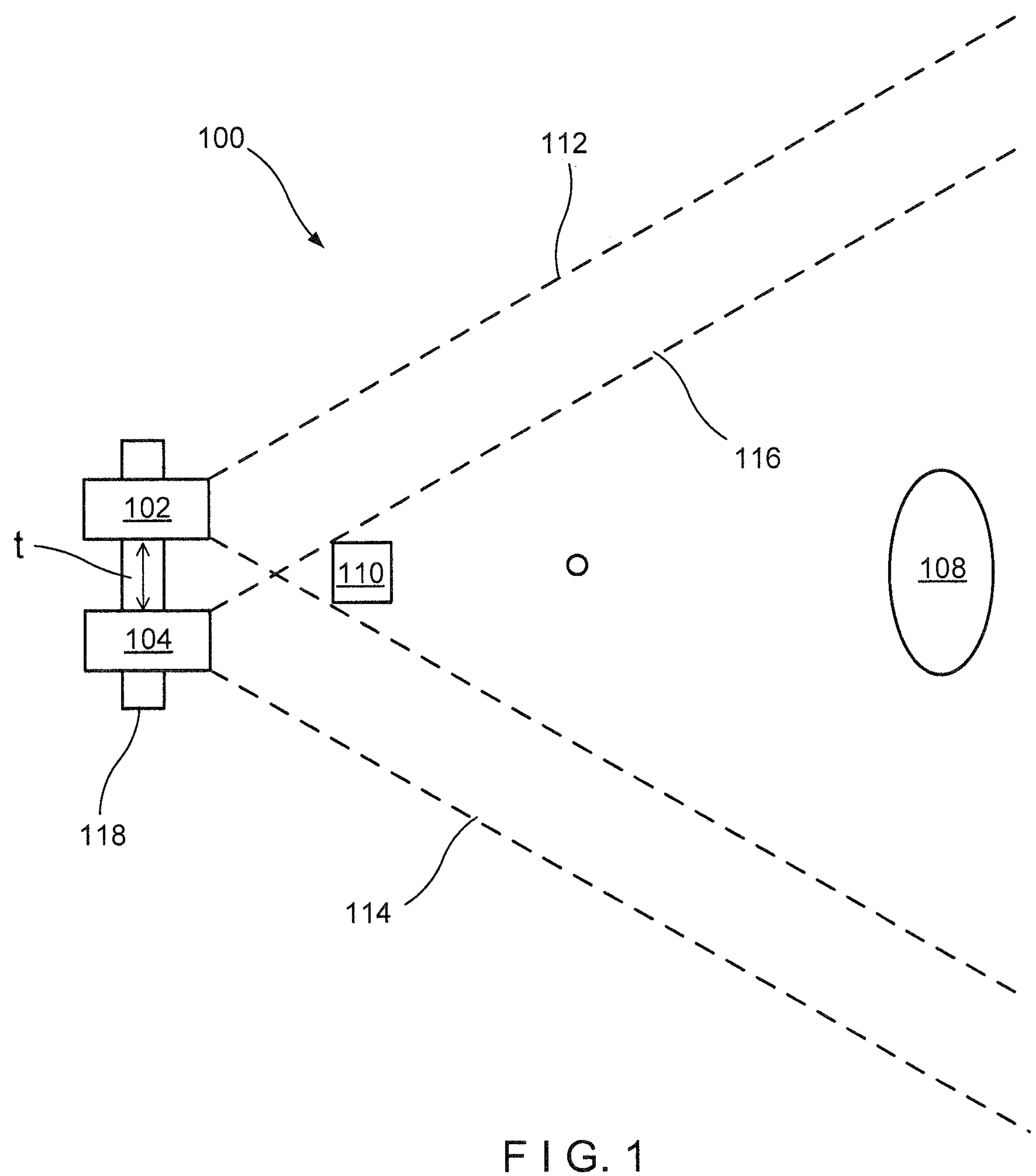
FIG. 1 shows a top view of a system for tracking an object according to an exemplary embodiment.

The exemplary embodiments may be further understood with reference to the following description and the related appended drawings, wherein like elements are provided with the same reference numerals. The exemplary embodiments relate to a device, a system, and a method for tracking objects by combining data from one or more imagers and one or more radar devices. Although exemplary embodiments detailed herein describe the tracking of baseballs and golf balls, those skilled in the art will understand that any sports balls or even non-sports related objects may be tracked with the system in the same manner. In the same manner, the system may track a baseball bat, a golf club or any other item that is detectable in the image and that generates a signal in the radar data.

FIGS. 1-4 show a first system 100 for tracking an object 106 according to the exemplary embodiments. The first system 100 includes two tracking devices—a radar tracking device 102 and an image tracking device or imager 104 positioned near a target area through which the object 106 will pass. In a first embodiment of FIG. 1, the system 100 is a system for tracking a baseball 106 moving within a target area (e.g. a baseball field) from a launch site located at, for example, a pitcher's mound 108 toward home plate 110. As would be understood by those skilled in the art, the launch site 108 may be located at any area within the field of view (FoV) of both the radar tracking device 102 and imager tracking device 104. As will be discussed in more detail below, the radar tracking device 102 will generally be a Doppler radar. In the embodiment of system 100, the radar device 102 is a one-dimensional radar however, one skilled in the art will understand that either a two-dimensional radar or a three-dimensional radar may be used. Furthermore, as will be discussed in more detail below, the imager 104 of the system 100 is a two-dimensional imager. However, a three-dimensional imager 104 may also be used. In the present embodiment, use of a one-dimensional radar device 102 measuring only range and/or range rate and a two-dimensional imager 104 measuring vertical and horizontal angles constructs a cost effective and accurate three-dimensional position measurement system. Those skilled in the art will understand that a range may be determined based on an initial range value (determined, for example, based on a priori knowledge) and integration of the range rate measured by the radar tracking device 102. That is, the range is determined as the initial range $R_0$ at time $T_0$ plus the integrated range rate over time R(t) may be determined based on the formula: $R(t)=R_0+\int(dR/dT$, from $T_0$ to t). For example, in baseball, the distance from the radar tracking device 102 to an average position at which the ball 106 is released from the pitcher's mound 108 is known to within a certain degree of accuracy. As would be further understood, this initial range may be determined using any known technique with the range being updated from this initial range using the formula above. Furthermore, those skilled in the art will understand that, for certain applications, it may be possible to obtain all the necessary information by combining the range/rate (and a calculated range) data from the radar device 102 with only a single angle (e.g., a horizontal angle) from the imager 104. For example, to track a ball rolling on a planar surface (e.g., a bowling ball) or an object moving over an uneven surface whose topography is known, such as a skier moving down a slope or a putt rolling on a green, the range data may be combined with knowledge of the geometry of the surface on which the object is moving and the single angle from the imager 104 to track the path of the object.

It is noted that the first system 100 including a single imager 104 and a single radar 102 is only exemplary. In other configurations, there may be one or more imagers capturing one or more images and/or one or more radar devices obtaining radar information. In an exemplary embodiment shown in FIG. 2, the system 100 includes a single radar 102 and two imagers 104, 104'.

The radar tracking device 102 may be any radar configured to measure reflected radiation to detect a range, position, velocity and/or spin of an object. The radar tracking device 102 may, for example, be a continuous wave Doppler radar emitting microwaves at X-band (10.5-10.6 GHz) emitting approximately 500 milliWatts EIRP (Equivalent Isotropic Radiated Power), thus being suitable for complying with FCC and CE regulations for short range intentional radiators. Any type of continuous wave (CW) Doppler radar may be used, including phase or frequency modulated CW radar, multi frequency CW radar or a single frequency CW radar. Tracking of objects may be based on the use of Doppler frequency spectrums. As would be understood, Doppler frequency spectrums refer to the data from continuous wave Doppler radar. Any other type of radar capable of tracking objects similar to those described herein may also be used, whether they track one-dimensionally, two-dimensionally or three-dimensionally. The radar device 102 has a FoV. As seen in FIG. 1, the radar 102 has a FoV 112 extending from the radar 102 and encompassing the target area. The FoV 112 may include the entire target area as well as an extended captured area around the target area or, in systems with multiple radars, only a portion of the target area.

The imager 104 may be any device configured to capture an image of the target area, the image can be configured to received radiation in the visual or non-visual spectrum (such as infra red). For example, the imager may be a still camera or a video camera. Therefore, a single image of the target area may be captured or a series of images may be captured sequentially over a period of time. The image(s) may be captured using any of a variety of techniques to generate different types of images (e.g., black and white, color, etc.). The imager 104 may also be configured with various features such as variable zoom or enlargement of elements in the target area, a selectable shutter time, a selectable number of images per time interval (e.g., frames per second), etc. As seen in FIG. 1, the imager 104 has a FoV 114 extending from the imager 104 and encompassing the target area. The FoV 114 may include the entire target area as well as an extended captured area around the target area or, if multiple imagers are included in an embodiment, each imager may have a field of view encompassing only a portion of the target area.

The radar 102 generates data to measure at least one dimension. For example, a one-dimensional radar generates data indicating a range and/or range rate (collectively or individually referred to herein as "range") to a target; a two-dimensional radar generates data indicating range and/or range rate as well as a vertical angle or a horizontal angle; and a three-dimensional radar generates data indicating range and/or range rate, a vertical angle and a horizontal angle. The imager 104 captures an image including two or three dimensions. For example, the imager 102 may capture a two-dimensional image permitting measurement of a vertical angle and a horizontal angle or a three-dimensional image permitting identification of a three-dimensional location of a target (i.e., measuring a range as well as vertical and horizontal angles). The embodiment of system 100 utilizes a one-dimensional radar 102 and a two-dimensional imager 104. However, further embodiments may utilize any combination of the radar 102 and imager 104 such that information of all three dimensions (e.g., range, vertical angle and horizontal angle) are captured at selected time periods. For example, a three-dimensional radar and a three-dimensional imager provide redundant data that may be used to verify results and/or increase a level of confidence in their accuracy.

Figure 3:
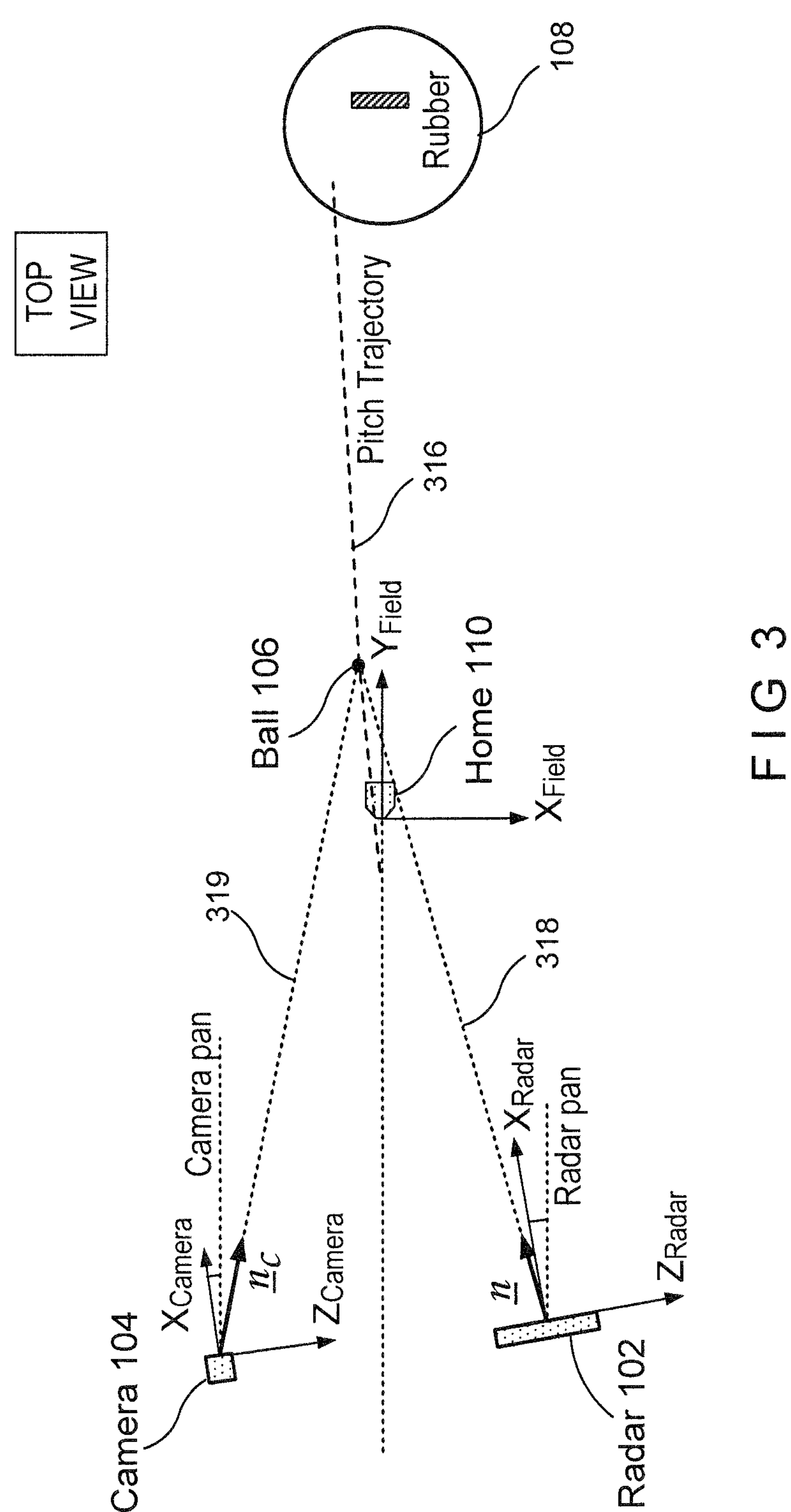
FIG. 3 shows an overhead view of the system of FIG. 1.
Figure 4:
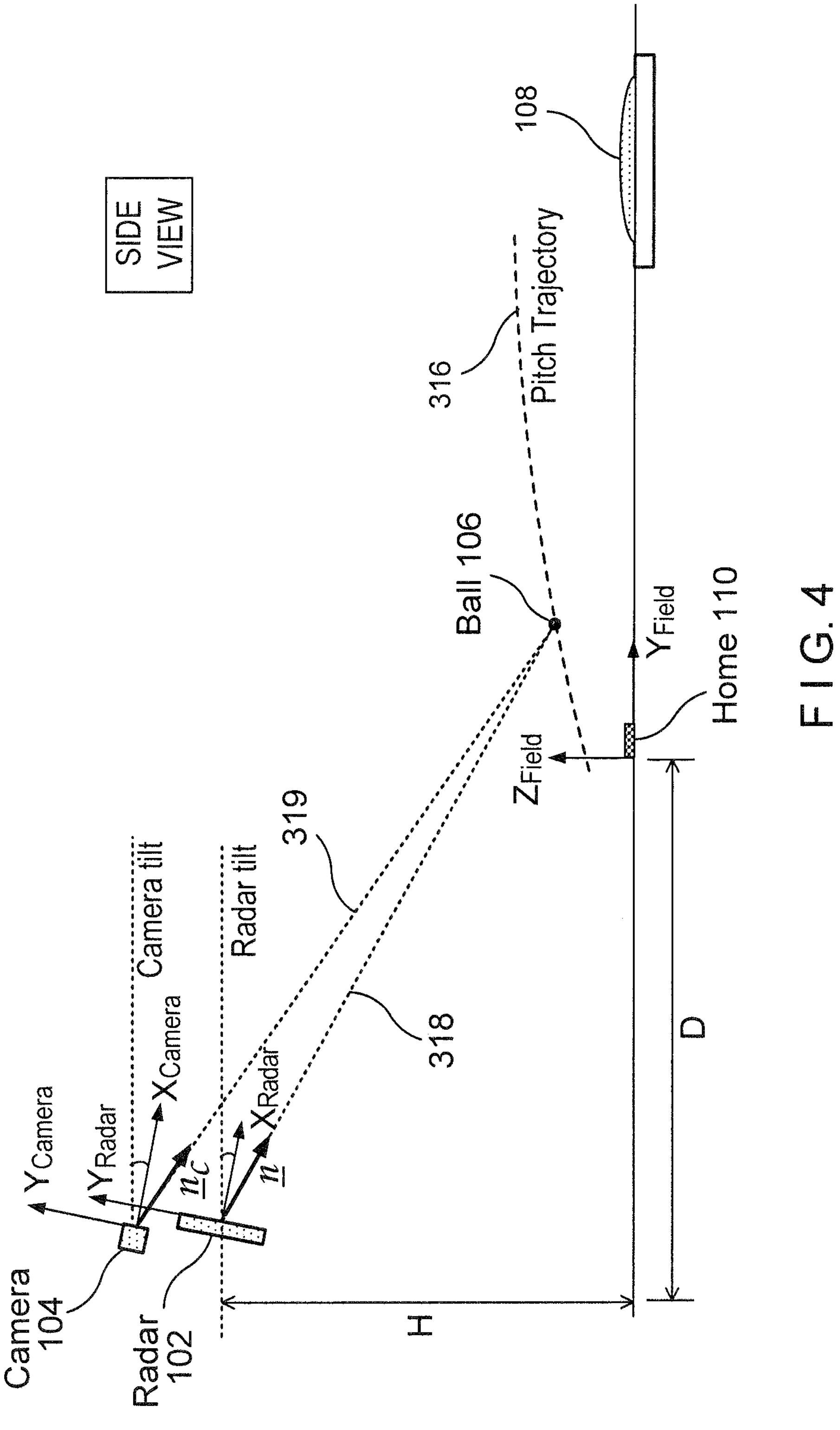
FIG. 4 shows a side view of the system of FIG. 1.
Figure 5:
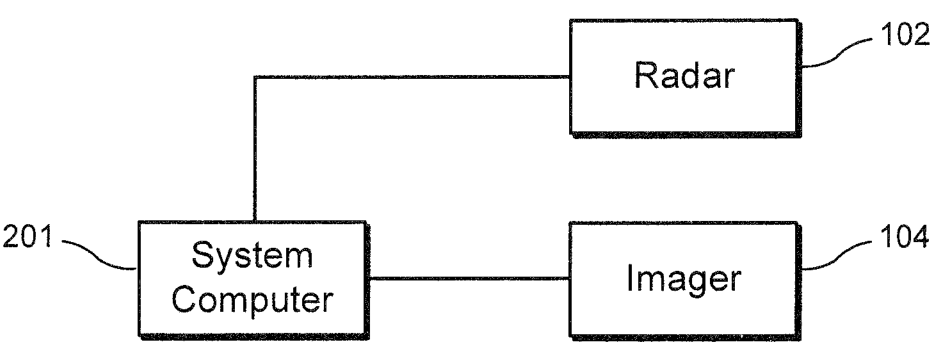
FIG. 5 shows a schematic view of the radar tracking device, image tracking device and data processing system according to a first embodiment of the system of FIG. 1.

As illustrated in the views of FIGS. 3-4, a target area may be a space through which a baseball 106 travels along a trajectory 316 from a pitcher's mound 108 to home plate 110. More particularly, the overhead view of FIG. 3 shows a range and a horizontal angle from the radar 102 to a location of the ball along its trajectory 316 while the side view of FIG. 4 shows the range and vertical angle from the radar 102 to the location of the ball along its trajectory 316. A field-based coordinate system is also identified in FIGS. 3 and 4 including a field x-axis, a field y-axis, and a field z-axis centered at the vertex of home plate. The radar 102 and imager 104 are illustrated in a baseball stadium setup positioned a distance D (in this embodiment, approximately 45 m) behind and a distance H (in this embodiment, 15 m) above home plate 110. If in a practice setup such as a bull pen or batting cage, the radar 102 and imager 104 are positioned much closer such as 2-10 m behind and 0-3 m above home plate. The radar defines radar x, y and z-axes and the imager defines imager x, y and z-axes. As shown in the figures, the radar 102 transmits radiation to the target along path 318 with distance R 502 and receives radiation reflected from the target along path 318. Similarly, a path 319 with distance $R_c$ 504 extends from the imager 104 to the baseball 106. Knowing a vector from either the radar device 102 or the imager 104 to the vertex of the field based coordinate system, the system 100 can translate and rotate positions defined in either of the coordinate systems from the radar device 102 or the imager 104 to the corresponding positions in the field based coordinate system. This allows the system 100 to give results relative to the positions on the field (e.g., calling balls and strikes, fair and foul, etc.).

As will be described in greater detail below, the radar 102 and imager 104 capture radar data and images, respectively, of an object along a path in a time-synchronized manner. That is, a first radar data and first image may correspond to a position of the target at a first time while the object is traveling along the path. The radar 102 and imager 104 both track the object during a period of time to generate radar data and images, respectively, that are time synchronized by the system 100 (as described below) when the path is within the FoV 112 and FoV 114. Accordingly, the FoV 112 of the radar 102 and FoV 114 of the imager 104 must overlap in an overlap area 116, as seen in FIG. 1. The time synchronization ensures that each radar data point and every imager data point has a common time base. The time synchronization can be achieved in many ways. One method being having a hardware trigger signal being recorded in the radar data when every image is taken. Another method uses a time event that can be identified in both the radar and image data, such as a ball being released or hit by bat, impacted by a golf club etc. In the second method, there will additionally be a recording or a prior knowledge of the sample rate of the radar data and frame rate of imager, to position any additional image frames relative to the radar data.

As seen in FIGS. 3 and 4, the radar 102 and imager 104 of the system 100 are positioned behind and facing a target area including home plate 110 and the pitcher's mound 108. Both devices 102, 104 in this embodiment are positioned so that each FoV 112, 114 encompasses home plate 110, the pitcher's mound 108, and some of the surrounding area. This location close to and above the field is selected to permit the tracking devices 102, 104 to have a clear view of the moving object (i.e., the baseball) during all or nearly all of its trajectory. For a typical baseball field, this means that the radar 102 and imager 104 are positioned behind home plate 110 and elevated above the players so that occlusion of the trajectory by the batter, catcher and umpire is minimized. In some embodiments, the optimal position of the tracking devices 102, 104 will be behind home plate 110 approximately 30-50 meters (m), or, more specifically, 45 m, and elevated above the field approximately 10-20 m, or, more specifically, 15 m. In an exemplary embodiment, a mount 118 may be used to couple the system 100 to a baseball stadium. The mount 118 may be fixed to a grandstand or other structure. In another embodiment, a tripod or other stand may be placed on the ground to position the radar 102 and imager 104 to face a desired scene (e.g., behind home plate 110 facing the pitcher's mound 108). Although the exemplary embodiments herein for the first system 100 relate to the mount 118 providing a fixed positioning of the tracking devices 102, 104, those skilled in the art will understand that the exemplary embodiments may also be modified for use with tracking arrangements capable of movement.

Radar device 102 and imager 104 are positioned at an initial known position and orientation relative to one another and to the target area. As described above, in an exemplary embodiment, the tracking devices 102, 104 are positioned behind and elevated above the target area (i.e., baseball field). The radar device 102 and the imager 104 are positioned a known distance, t, from one another, as shown in FIG. 1 (as described in more detail below, the separation between the radar 102 and the imager 104 are defined by a vector t of known length t and orientation). In exemplary embodiments, the devices 102, 104 are positioned such that one tracking device is located directly above the other, directly on the side of the other, or in any other suitable relative positioning as long as the FoVs 112 and 114 of the tracking devices 102, 104 overlap and the vector, t, between the devices 102, 104 is known.

Figure 6:
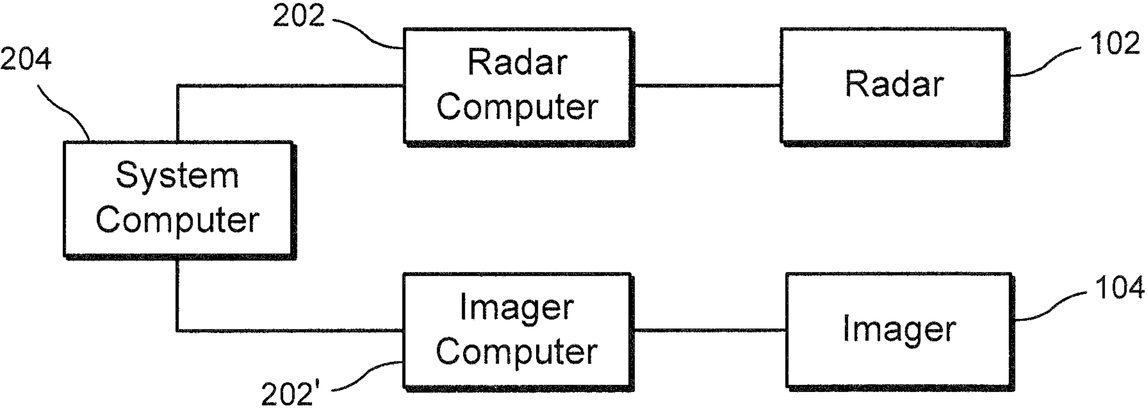
FIG. 6 shows a schematic view of the radar tracking device, image tracking device and data processing system according to a second embodiment of the system of FIG. 1.

The system 100 includes a data processing system 200 which, as would be understood by those skilled in the art, may include one or more computers coupled to the radar device 102 and the imager 104 via either wired or wireless connection. In an exemplary embodiment, a single computer 201 is used to perform the radar and image tracking as well as the merging of the data output from the radar device 102 with the data from the imager 104. However, in another exemplary embodiment, the data processing system 200 includes separate computers 202, 202', each associated with a corresponding one of the radar device 102 and the imager 104 as well as a central computer 204 that coordinates data from the two computers 202, 202', as shown in FIG. 6. One skilled in the art will understand that any number of computers may be used with the various tasks distributed among the computers in any desired fashion. As would be understood by those skilled in the art, the data processing system 200 includes the hardware, firmware, and software necessary to provide the functionalities described in the present application. In an exemplary embodiment, each of the radar device 102 and the imager 104 defines its own coordinate system relating to its recorded track data. The data processing system 200 then defines a universal three-dimensional coordinate system into which the computer translates the tracking data from the respective radar coordinate system and imager coordinate system. For example, this may be a coordinate system with a vertical z axis and horizontal x and y axes and a vertex at a location within the target area (e.g., at the vertex of home plate).

Data from the radar device 102 and the imager 104 are time synchronized to ensure accuracy of the tracking information based on the combination of data from these two sources. For example, when correlating range information from radar device 102 to frames captured by the imager 104 relating to a baseball thrown by a pitcher, the level of accuracy in calculating the position of the baseball is increased when the times at which each of these data points was captured are properly matched to one another. That is, to ensure accurate tracking, it is necessary to ensure that the data merged from the radar device 102 and the imager 104 correspond to the position of the ball at the same time (or as nearly the same time as possible). As noted above, the radar 102 may be a CW Doppler radar generating radar data at time intervals much shorter than the frame rate of the imager (i.e., the number of frames captured per second). Thus, even though there is not a 1:1 correspondence between the data points, it is necessary to match the radar data to the frame from the imager 104 most nearly synchronous therewith to accurately determine the trajectory of the baseball. To increase time match between respective captured images during this short period of time, the radar device 102 and imager 104 may be hardwired together so that, for example, the imager 104 may provide to the radar device 102 a signal indicating a timing of the capture for each frame so that an attached or integral computer may determine a time correspondence between images and radar data. Alternatively, a similar signal may be provided by the radar device 102 to the imager 104. For example, the imager 104 may receive a signal from the radar device 102 signaling when to take a picture or signaling to take a picture f.ex. at every 20 milliseconds (ms). In another example, the imager 104 can send a pulse to the radar device 102 signaling at what time each image frame was taken. Software on the data processing system 200 may then match the imager's image data to radar data from the radar device 102. In another example, every time the imager 104 takes an image, a signal may be sent to the radar device 102, which marks the time at which the frame was captured (making an allowance for a signal and processing delay) to sync the images from the imager 104 image to the corresponding radar data.

The flow chart of FIG. 7 shows a method 300 of operation implemented by the computer 201 for merging radar data generated by the radar device 102 with data from images captured by the imager 104 to create a three-dimensional trajectory of the object having a high certainty of accuracy of the parameters representing the three dimensions. The method 300 also relates to the above-described example of determining a trajectory of a baseball 106 thrown from the pitcher's mound 108 toward home plate 110 with regard to the system 100 of FIG. 1. In this example, the baseball 106 is the object tracked along a trajectory originating from the pitcher's hand on a pitcher's mound 108 toward home plate 110.

In step 310, the radar device 102 records radar data and the imager 104 records image data which is transmitted to the computer 201. As describe above, the radar 102 generates radar data corresponding to the object moving in the target area within a FoV 112. The imager 104 may capture images of a target area within a FoV 114 in which the object is moving. According to exemplary embodiments, it may be assumed that the object is moving in the target area within an overlap area 116 of the FoV 112 and the FoV 114.

In step 320, the computer 201 detects whether a target object is captured in either the radar data generated by the radar 102 or the images captured by the imager 104. The object detection may be performed using any identification mechanisms. For example, the computer 201 may utilize pattern recognition algorithms to detect the presence of a target object in one or more images. In another example, the tracking device 102 may detect a moving object in the radar data as well as restricting a search area. As will be described in more detail below, the system 100 may use a priori knowledge to define a region of interest (ROI) as a selected portion of the FoV 114 to be searched for the target object. For example, for baseball tracking, the system 100 may define an ROI as a portion of an image including the pitcher's mound 108 and some surrounding area as every pitch originates from this area. This reduces the computational burden and can accelerate the identification of the target object in the image data. Similarly, the system 100 can define a target range as a distance to the mound 108±a predefined margin as an ROI of data to be searched within the radar data. Movement detected within the ROI may, therefore, more quickly be identified as a pitched baseball 106.

In step 330, the computer 201 makes a subsequent measurement corresponding to a new position of the baseball 106 in one or both of the radar data and the image data. Based on this new data, the system 100 defines, in step 340, a new ROI for the radar (i.e., a new range within which the subsequent detection of the ball is expected) and a new ROI for the imager (i.e., a portion of the subsequent image (frame) within which the ball is expected to be located). Using the previous location and the range and/or range rate data from the radar, the system 100 predicts where the ball 106 will be at the subsequent radar reading and in the subsequent frame to define new ROI's for each of the radar 102 and the imager 104. The method then proceeds to steps 350 in which the system 100 tracks the object (i.e., locates the object within the ROI's of the radar device 102 and the imager 104). For the radar 102 the ROI also includes region of interest in range and/or range rate. As can be seen in the flowchart, data from the tracking based on radar data may be employed in the determination of the ROI for the imager 104 and data from the tracking based on imager data may be employed in the determination of the ROI for the radar device 102. As indicated above, in step 340, information from either the radar device 102 or the imager 104 about the position of the baseball 106 may be used to limit a portion of the respective FoVs 112, 114 to be searched by defining an ROI. In a first example, once an object has been identified by the radar device 102, the system 100 may define an ROI as a subset of the total FoV 112 as well as limitation of range and/or range rate which leads to a computational reduction for the radar data as the entire FoV 112 and range/range rate is not required to be analyzed for the presence of the ball 106. That is, only a portion of the FoV 112 may be analyzed while ignoring the remainder of the FoV 112, and similar only a part of the range and/or range rate are analyzed while ignoring the rest, which likely has no relevant information associated with the ball's trajectory. Similarly, based on a priori information or a prior location and/or trajectory of the ball 106, the system may set an ROI for the imager 104 as a subset of its total FoV 114 which leads to a computational reduction for the imager data since the entire FoV 114 need not be analyzed for the presence of the ball 106. That is, only a portion of the FoV 114 may be analyzed while ignoring the remainder of the FoV 114, which likely has no relevant information associated with the ball's trajectory. Similar to step 340, the radar track of the radar 102 may now be used to confirm the region of interest for the imager 104. Furthermore, if the imager 104 previously defined a region of interest in step 340, the radar track may identify an even smaller region of interest, resulting in further computational reduction for the imager data. Positive confirmation of the presence of the ball 106 from the imager 104 may confirm the radar data in setting the region of interest. Alternatively, a failure of the image data to confirm the presence of the ball 106 may be used to reject the radar track. Furthermore, an image track of the imager 104 may confirm the region of interest for the radar 102. Furthermore, if the radar 102 previously defined a region of interest in step 340, the image track may identify an even smaller region of interest, resulting in further computational reduction of the radar 102. Positive confirmation of the presence of the ball 106 from the radar 102 may confirm the image track in setting the region of interest. Alternatively, if the radar device 102 fails to confirm the presence of the ball 106 from the image data, this may be used to reject the image track. As would be understood by those skilled in the art, false image tracks may occur due to challenging light conditions, artifacts in images, similar false detection scenarios, etc.

Thereafter, in step 360, the tracking data from the radar and imager are merged to calculate a three-dimensional position of the ball 106 (e.g., translated into the field coordinates) and this data may be provided as a live data stream available for other applications, such as overlaying tracking results on live video or 2D/3D computer graphics, f.ex. for broadcast purpose. In step 370, the system 100 determines whether this represents the end of the track. If yes, the method proceeds to step 380 in which output data (e.g., calculating the break of a pitch, etc.) is generated and, if no, the method 300 returns to step 330. Specifically, the baseball 106 is tracked from a first image when the baseball 106 is traveling along the trajectory to a final image when the baseball 106 impacts an object such as a bat, a glove, or the ground. The baseball 106 is also tracked from a first location in which the baseball 106 is identified in the radar or image data until a final location in which the baseball 106 has stopped or has deviated its course above a deviation threshold (e.g., velocity vector changes direction). At this point, if the trajectory has deviated beyond a threshold value (e.g., if the ball 106 is hit by the batter), the system 100 may begin following the new trajectory and the method 300 will recommence defining new ROI's based on the new trajectory until the new trajectory ends.

Steps 330-370 may be repeated at each time interval for which new radar measurements or new image frames are generated. For example, in an exemplary system, the computer 201 may perform step 330 every 20 ms (or 50 times per second) for each new frame recorded, or perform step 330 every time a new radar measurement is taken which is typically much more frequent such as 1-5 ms. For each radar measurement taken by the radar device 102, the computer 201 may calculate the range to the ball 106 using raw Doppler radar data.

Figures 9A, 9B:
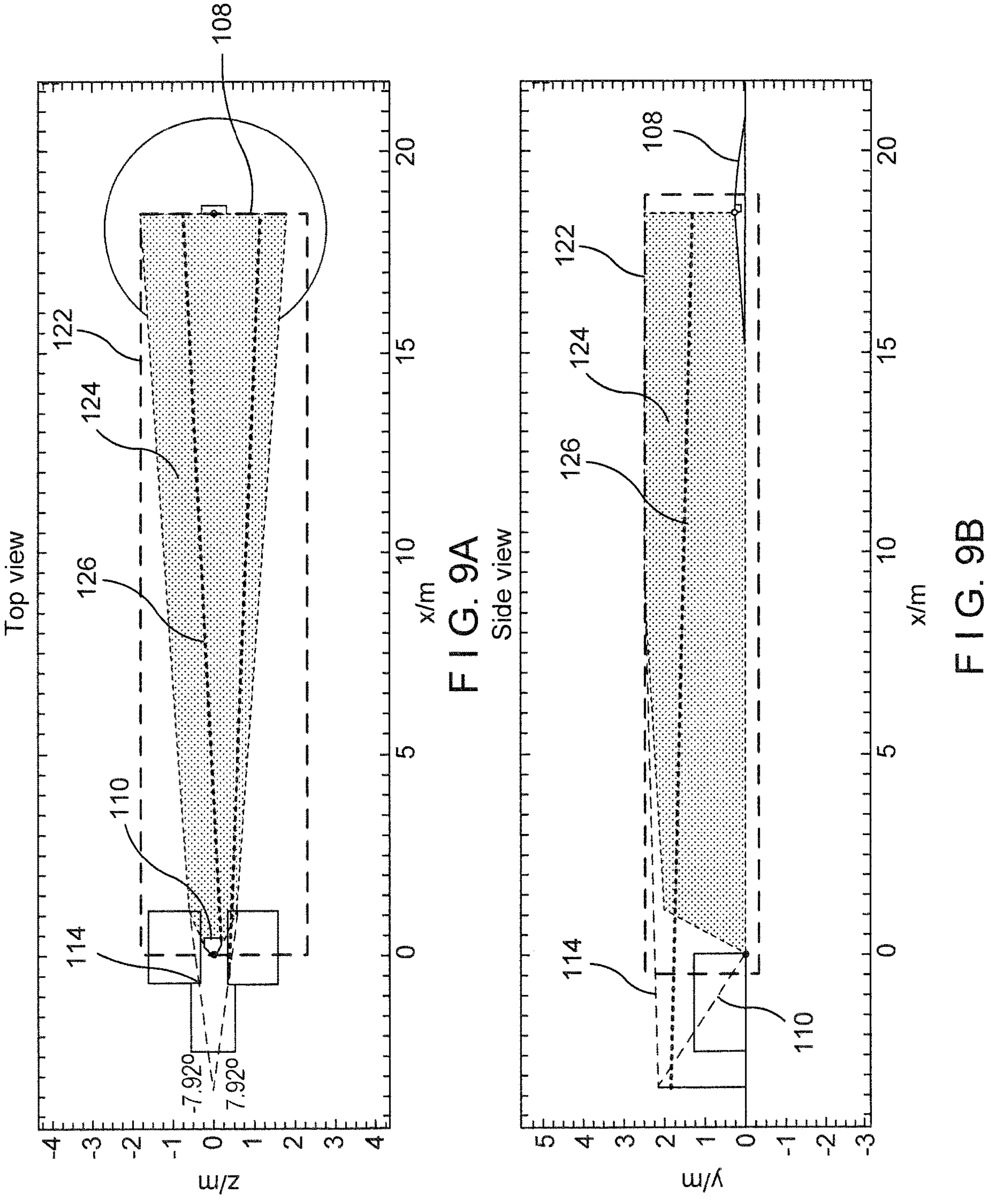
FIG. 9A shows a top tracking view produced by the system of FIG. 1.
FIG. 9B shows a side tracking view produced by the system of FIG. 1.

FIGS. 9A-B show overhead and side views of an exemplary region of interest set by the radar track for the imager. FIG. 9A shows a top tracking view while FIG. 9B shows a side tracking view of the system of FIG. 1. As can be seen, the target area 122 may be a space from the pitcher's mound 108 to home plate 110 through which the baseball 106 is expected to move. In the exemplary embodiment, the imager 102 has a horizontal axis that is aligned parallel to the axis extending from the rear point of home plate 110, bisecting the pitcher's mound 108 and a lateral axis that is aligned parallel to the axis passing through the rear point of home plate 110, perpendicular to a plate defining home plate 110. The FoV 114 is shown as extending between the angles +7.92 degrees and −7.92 degrees horizontally, and between +1.37 degrees and −33.37 degrees vertically. Based on a priori information, the baseball 106 is anticipated to be between the pitcher's mound 108 and home plate 110, thus reducing the FoV 114 to a ball tracking area 124. When the described method of identifying a region of interest is applied, the radar track from radar 102 may be used to further reduce the ball tracking area 124. That is, the radar 102 may indicate ranges for the baseball 106 that defines where the baseball 106 is located. Thus, the images captured and correlated to this time frame in which the radar track is being used may reduce the ball tracking area 124 to, for example, a region of interest 126 for analysis purposes.

As described above, in step 360, the radar track and the image track are merged to determine the position of the ball 106 in a three-dimensional coordinate system (e.g., the field-based coordinate system). In the exemplary embodiment described above, the radar 102 may generate one-dimensional radar data measuring ranges and the imager 104 may capture two-dimensional imager measuring vertical and horizontal angles. The computer 201 may merge the information such that all three parameters (e.g., dimensions) are known for the trajectory of the object. As shown in FIGS. 4 and 10, the computer 201 determines the position of the object by calculating a unity vector, $\underline{n}_c$ 506, extending from the imager 104 toward the object 106 based on a pixel value $(u_{PX}, v_{PX})$ 106' within the image corresponding to the image of the ball 106 in FIG. 8. Various well known methods exist to convert a pixel to an angle measures, taking into account various imperfections of the imager system, optics etc. In the following, a preferred method is described which does not account for lens distortion. The pixel position $(u_{PX}, v_{PX})$ is first converted to a normalized pixel (u,v) using [1] by the computer 201.

$$(u, v) = \frac{(u_{PX} - pp_u, v_{px} - pp_v)}{f} \quad [1]$$

where (upx, vpx) 106' is the pixel value in the image, $(pp_u, pp_v)$ is a principal point within the image (typically very close to the center of the image) and f is the focal distance, which are predetermined for the imager 104.

The normalized pixel (u,v) is then converted to a unity vector $\underline{n}_c$ 506 using the equation [2] by the computer 201.

$$\underline{n}_C = ((\alpha_C, \beta_C, \gamma_C) = (1 - v, u)/1 + u^2 + v^2. \quad [2]$$

Upon installation, the displacement vector $\underline{t}$ 500 between the radar 102 and the imager 104 (and its length t=|t|) is determined. Thus, when the ball 106 is detected in the image at the pixel position $(u_{PX}, v_{PX})$ 106' from the imager 104 shown in FIG. 8 the system 100 calculates the unity vector $\underline{n}_c$ 506, which together with the range R 502, determined from the radar data from radar 102, determines the position of the ball 106 in three-dimensions. Specifically, a triangular relationship is established: With the vector $\underline{t}$ 500 representing a first leg of the triangle, the distance R 502 as a second leg of the triangle (measured range of the baseball 106 relative to the radar 102) and the angle $\varphi_c$ 514 determined based on the relationship between the vectors $\underline{n}$c 506 and $\underline{t}$ 500, the system can calculate the distance $R_c$ 504 from the imager to the ball 106 as follows.

The previously described vector $\underline{n}_c$ 506 is the unity vector measured from the imager 104 and a vector $\underline{n}$ 508 is a unity vector measured from the radar 102 towards the ball 106. Similar to the unity vector $\underline{n}_c$ 506 in equation [2], then unity vector $\underline{n}$ has the coordinates $\underline{n}=(\alpha,\beta,\gamma)$. An angle 510 (denoted as $\varphi_R$) is defined as the angle between the vector $\underline{n}$ 508 and the vector $\underline{t}$ 500 while an angle 512 (denoted as $\varphi_T$) is defined as the angle between the vectors $\underline{n}$ 508 and $\underline{n}_c$ 506 and an angle 514 (denoted as $\varphi_c$) is defined as the angle between the vectors $\underline{n}_c$ 506 and $\underline{t}$ 500. Then $\varphi_c$ 514 is equal to: $\text{acos}(\text{dot}(\underline{n}_c, t/|t|))$, where dot( ) denotes the vector product. After determining $\varphi_c$ 514, $\varphi_T$ 512 may be determined as equal to: $\text{asin}((|t|/R)(\sin\varphi_c))$. After determining $\varphi_T$ 512, $\varphi_R$ 510 may be determined as equal to: $\pi-(\varphi_T+\varphi_C)$ in radians. The distance $R_c$ 504 may subsequently be determined based on the angles as equal to: $R\cdot(\sin(\varphi_R)/\sin(\varphi_c))$. Thus, the combined three-dimensional tracking (denoted by the position vector X with origin the radar position 102) of the baseball 106 may be determined as $\underline{X}=R\cdot\underline{n}=R_c\cdot\underline{n}_c-\underline{t}$. Alternatively the three-dimensional position of the ball 106 might be determined with origin at the imager position 104 represented by the vector $\underline{X}_c=R_c\cdot\underline{n}_c$. In the above, the calculation method has been explained with an a priori known three-dimensional displacement vector $\underline{t}$ between the radar 102 and the imager 104. There are no limitations on the distance t of the displacement nor the orientation oft as long as the FoV 112 and 114 overlap. If the distance t fex. is small relative to the distances $\underline{t}$ 502 and $R_c$ 504, then $R_c$ can be assumed to equal R with only a small uncertainty, thus simplifying the calculations. This corresponds to assuming that t equals the null vector $\underline{0}$, which is the situation where the imager 104 is placed in the origin of the radar 102.

It is again noted that the imager 104 and the radar device 102 are time synchronized such that the information extracted from the images and the radar data may be correlated to one another. Through the time synchronization, the computer 201 merges the parameters to determine a three-dimensional tracking of the baseball 106 and ultimately the trajectory 316. Fore example, the computer 201 may be configured to execute a trajectory application. The trajectory application may receive parametric information of the trajectory 316 from the data merging application. The trajectory application may determine the trajectory based on the parametric information. For example, the trajectory application may determine a first three-dimensional location of the object 106 in a target area 122 given first parametric information at a first time and subsequently determine a second three-dimensional location of the object 106 in the target area 122 given second parametric information at a second, later time. Using the first and second three-dimensional locations in the target area 122, the trajectory application generates a tracklet that connects the first and second three-dimensional locations. The trajectory application may continue to perform these operations to determine further tracklets at later times. The tracklets may then be connected in chronological order to determine the trajectory of the ball 106.

Those skilled in the art would understand that in another exemplary embodiment, the radar 102 may capture three-dimensional information measuring the vertical and horizontal angles as well as the range to the ball 106. In this instance, n may be directly determined from the radar data. Accordingly, the vertical and horizontal angle data from the radar and the imager may be weighted to obtain more accurate results. Typically vertical and horizontal angle data received from the imager 104 will be more accurate and will be weighted more heavily. However, in some cases (e.g., background and ball are similar in color, another object partially blocks the ball or occlusion in the image) radar data may be more accurate. In another exemplary embodiment the imager 104 and the radar device 102 may both individually capture three-dimensional images measuring vertical and horizontal angles as well as ranges. In this instance, the computer 201 may merge the information such that the vertical angle measurements are merged together, horizontal angle measurements are merged together, and ranges are merged together such that all three parameters utilize redundant information to enhance accuracy.

It is again noted that the use of a baseball is only exemplary. The exemplary embodiments may be utilized to track any object or part of an object within a target area that may be identified in both the images and the radar data. For example, the object may be any other type of ball, a club head on a golf club, a golf shaft, baseball bat, tennis racket etc.

In another exemplary embodiment in which system 100 may be implemented, a trajectory of a golf ball that is being putted may be determined. The following relates to determining the trajectory of the golf ball and incorporating all of the above-described features in which data derived from images captured by a two-dimensional imager and data derived form a one-dimensional radar are merged and analysis of images are reduced to a region of interest as defined by a radar track. Even though the below example shows tracking of a golf ball being putted, the exact same method can be used for any type of golf shots or any other moving object as long as it is detectable in both radar data and imager data.

Figures 12A, 12B, 12C:
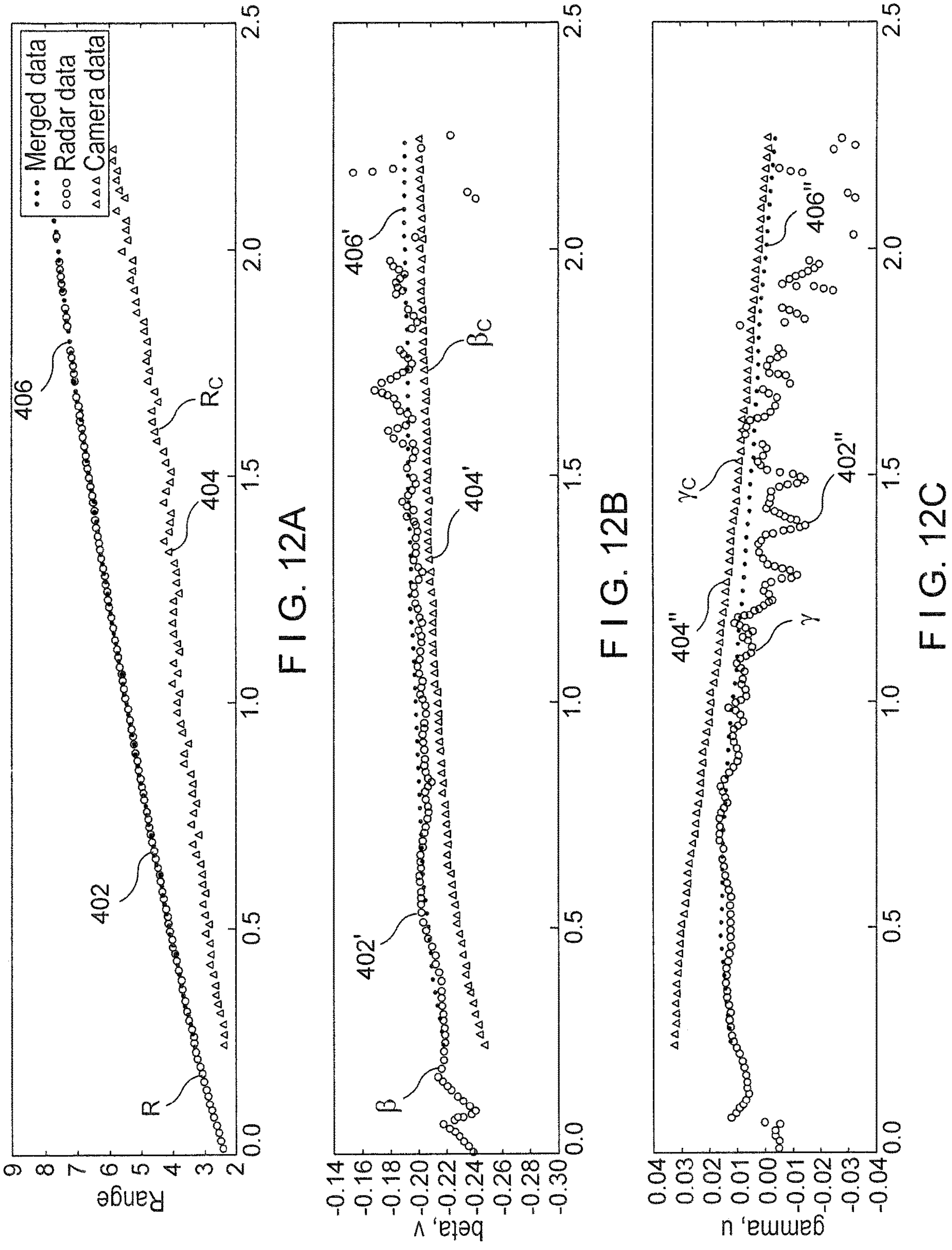

FIGS. 12A-C show exemplary results obtained from the system 100 according to the above golf embodiment. As can be seen in the figures, FIG. 12A shows exemplary range results, FIG. 12B shows exemplary vertical component results, and FIG. 12C shows exemplary horizontal component results, with each graph providing radar data, imager data and merged data. Specifically, FIG. 12A shows range results 402 determined from the radar 102 corresponding to R 502, range results 404 determined from the imager 104 corresponding to $R_C$ 504 and range results from merging data 406 with origin being the radar 102 corresponding to R 502. Merged data 406 is a result of merging the radar data 402 with the imager data 404. Those skilled in the art will understand that, under certain circumstances, the imager 104 may not provide sufficiently accurate information as to the range. Thus, the imager data 404 may be omitted or weighted less in the merged data 406 for the range results. Accordingly, merged data 406 may more closely follow the curve of the radar data 402, as can be seen in the figure. FIG. 12B shows vertical component results 402' determined from the radar data corresponding to β (vertical coordinate of the unity vector $\underline{n}$ 508), vertical components results 404' determined from the image data corresponding to $\beta_c$ (vertical coordinate of the unity vector $\underline{n}_c$ 506) and vertical component results from merged data 406' with origin being the radar 102 corresponding to β. In this instance, those skilled in the art would understand that, under certain conditions, the radar device 102 may not provide sufficiently accurate information for determining a vertical component or angle. Thus, the radar data 402' may be weighted less in the merged data 406' for the vertical component results. FIG. 12C shows horizontal component results 402" determined from the radar data corresponding to γ (horizontal coordinate of the unity vector $\underline{n}$ 508), horizontal components results 404" determined from the image data corresponding to $\gamma_c$ (horizontal coordinate of the unity vector $\underline{n}_c$ 506) and horizontal component results from merged data 406" with origin being the radar 102 corresponding to γ. Similar to the vertical angles, with horizontal angles, the radar 102 may not, under certain conditions, provide acceptably accurate information for determining the horizontal component or angle. Thus, the radar data 402" may be weighted less in the merged data 406" for the horizontal results.

FIGS. 12D-12F shows the same data as FIGS. 12A-C however, now data are shown in Cartesian coordinates (x,y,z) with origin at the starting position of the golf ball 106 instead of in R,β,γ. Specifically, graphs 12D-12F show the position of the object 106 over time where the coordinate system is zero at a starting location of the ball (e.g., the beginning position of the putt). FIG. 12D provides the x-axis results of the object 106 corresponding to the radar data 412, imager data 414 and merged data 416, the x-axis pointing toward the target area, FIG. 12E provides the y-axis results of the object 106 corresponding to the radar data 412', imager data 414' and merged data 416', the y-axis being the vertical axis parallel with the plumb line, and FIG. 12F shows the z-axis results of the object 106 corresponding to the radar data 412", imager data 414" and merged data 416", the z-axis completing the Cartesian right handed coordinate system.

FIG. 13 depicts an exemplary output of the trajectory of the golf ball 106. Specifically, FIG. 13 shows a first trajectory of the ball 106 based on radar data 422 overlaid in the image with a second trajectory based on image data 424. The computer 201 may utilize the information found in FIGS. 12A-12F as well as timing information to identify an image or a series of images upon which the graphical representation of the trajectory is to be shown. As noted before, this exemplary output data may be generated by the computer 201, which, as would be understood by those skilled in the art, may include all hardware, firmware, and software necessary for providing this data generation functionality.

The exemplary embodiments provide a device, system, and method to determine a three-dimensional trajectory of an object in which information from images captured by an imager and radar data generated by a radar are merged. The information is merged in such a way that each dimension of the trajectory is determined from a source that provides corresponding information that has a certainty above an acceptable threshold. Redundant information may also be utilized in corroborating a parameter determination. Through merging the information based on a time synchronization, the three-dimensional trajectory may be generated in a more robust, accurate, and versatile manner.

Those skilled in the art will understand that although the previously described embodiments describe a baseball pitch in detail and a golf ball putt more briefly, the above-described exemplary embodiment may be implemented to track the movement of any object in various trajectory types (i.e., free flying, bouncing or rolling). For example, the system 100 may also track a tennis ball at any part of a rally, including a serve. In another exemplary embodiment, the described system 100 may also be used to track a soccer ball, in particular higher velocity kicks at a goal. In a further exemplary embodiment, the described system 100 may be used to track a bowling ball when sliding and rolling down the bowling lane. Those skilled in the art will also understand that the system 100 is not limited to tracking the movement of spherical objects but may track the movement of any type of object. For example, the system 100 may track the movement of a baseball bat or a golf club when swinging at a ball. The system 100 may also be used to track parts of an athlete such as the hand of the baseball player throwing a ball, or hand trajectory of a golfer. Furthermore, the system 100 may also be used to track an alpine skier down a ski slope, or a ski jumper both on the ramp and during the flight and landing.

Those skilled in the art will understand that the above-described exemplary embodiments may be implemented in any suitable software or hardware configuration or combination thereof. An exemplary hardware platform for implementing the exemplary embodiments may include, for example, an Intel x86 based platform with compatible operating system, a Windows platform, a Mac platform and MAC OS, a mobile device having an operating system such as iOS, Android, etc. In a further example, the exemplary embodiments of the above-described method may be embodied as a program containing lines of code stored on a non-transitory computer readable storage medium that may be executed on a processor or microprocessor.

It will be apparent to those skilled in the art that various modifications may be made in the present disclosure, without departing from the spirit or the scope of the disclosure. Thus, it is intended that the present disclosure cover modifications and variations of this disclosure provided they come within the scope of the appended claims and their equivalent.

What is claimed is:

1. A system for tracking a movement of an object, comprising:

a radar device having a first field of view, the radar device generating radar data corresponding to a range indicating a distance of a moving object within the first field of view from the radar device;

an imager having a second field of view at least partially overlapping the first field of view in an overlap field of view, the imager generating imager data measuring, as the object moves through the second field of view, angular positions of the object relative to the imager in at least one dimension;

a memory storing topographical information for a surface over which the object to be tracked will move; and a processor combining the imager data, the radar data and the topographical information to identify a track of the object in three dimensions as the object moves through the overlap field of view, the angular positions of the object being determined using data from the imager.

2. The system of claim 1, wherein the radar device is a one-dimensional radar.

3. The system of claim 1, wherein the processor includes data corresponding to a separation vector indicating a position of the radar device relative to the imager.

4. The system of claim 3, wherein the processor calculates a unity vector from the imager to the object and, based on the unity vector, the radar data and the separation vector, the processor calculates the position of the object in three dimensions.

5. The system of claim 4, wherein the processor defines a field based coordinate system based on reference points within the second field of view and translates and rotates the position of the object in three dimensions into the field based coordinate system.

6. The system of claim 1, wherein the object is a golf ball and wherein the topographical information concerns a putting green on which the golf ball to be putted.

7. The system of claim 1, wherein the object is a sports ball and wherein the system weights the radar data more heavily than imager data in determining the range and weights imager data more heavily than the radar data in determining angular positions.

8. The system of claim 1, wherein the radar device is a Doppler radar.

9. The system of claim 1, wherein the processor calculates a range from the radar device based on an initial value of the range and the integrated range rate over time determined from the radar data.

10. A method for tracking a movement of an object, comprising:

positioning a radar device aimed so that a first field of view covers at least a portion of a target volume through which an object is to move, the radar device generating radar data corresponding to a range indicating a distance of a moving object within the first field of view from the radar device;

positioning an imager aimed so that a second field of view of the imager at least partially overlaps the first field of view within a desired portion of the target volume, the imager generating imager data measuring, as the object moves through the second field of view, angular positions of the object relative to the imager in at least two dimensions; and combining the imager data, the radar data and topographical information for a surface over which the object to be tracked will move to identify a track of the object in three dimensions as the object moves through the overlap field of view.

11. The method of claim 10, wherein all of the angular positions of the object being determined using only data from the imager.

12. The method of claim 10, the object is a sports ball further comprising:

weighting the radar data more heavily than imager data in determining the range; and weighting imager data more heavily than radar data in determining angular positions of the sports ball.

13. The method of claim 10, wherein the object is a golf ball and wherein the topographical information concerns a putting green on which the golf ball to be putted.

14. The method of claim 10, further comprising:

defining by a processor a field based coordinate system based on reference points within the second field of view; and translating and rotating by the processor the position of the object in three dimensions into the field based coordinate system.

15. The method of claim 10, wherein the radar device is a one dimensional doppler radar.

* * * * *